C. E. HUBBARD.
ELECTRIC BROILER AND TOASTER.
APPLICATION FILED MAY 26, 1917.
1,251,232.
Patented Dec. 25, 1917.
2 SHEETS—SHEET 1.
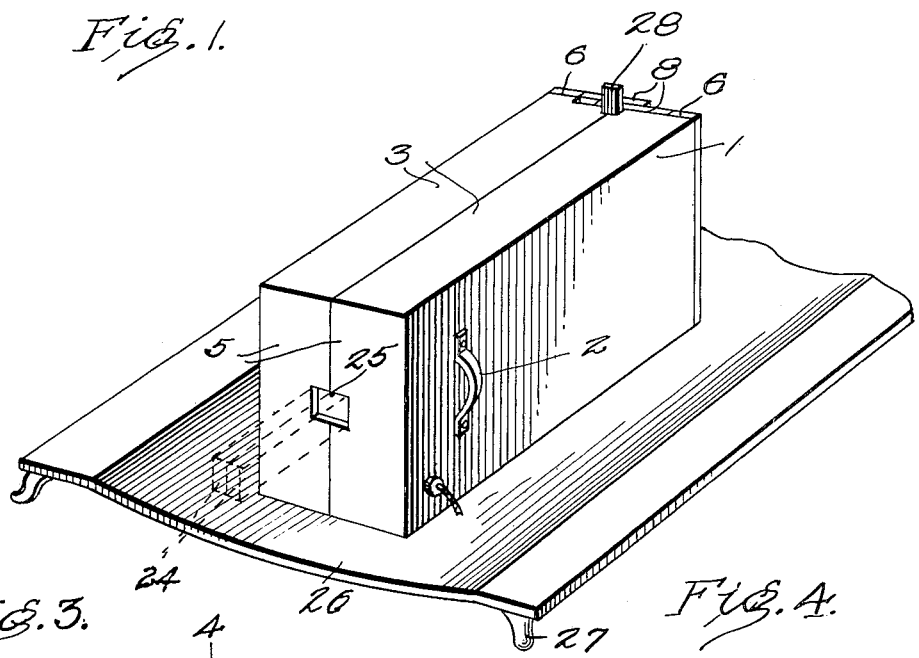
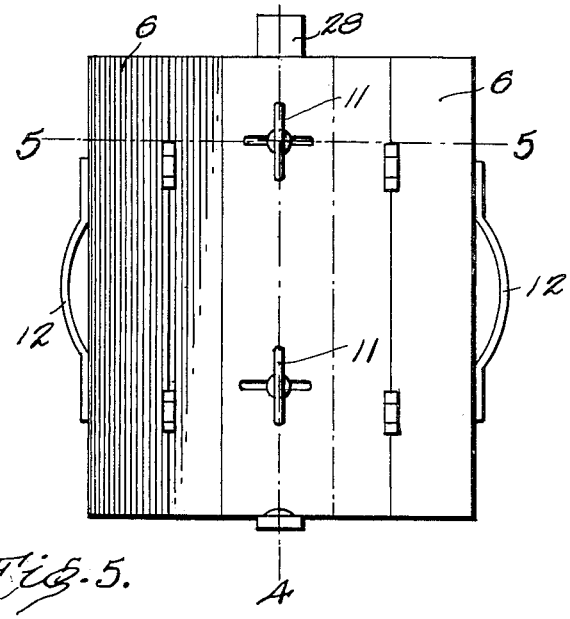
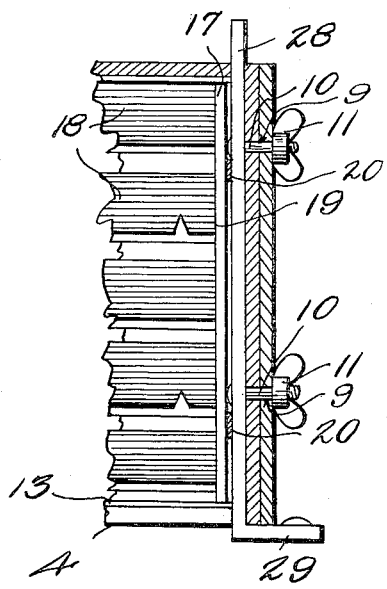
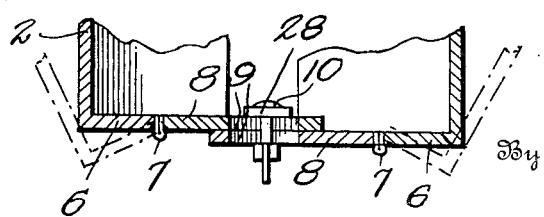
Inventor
C. E. Hubbard
his Attorneys

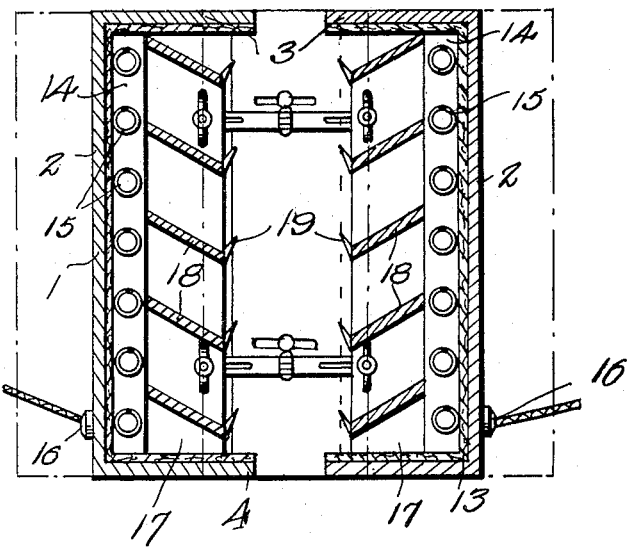

UNITED STATES PATENT OFFICE.

CHARLES E. HUBBARD, OF NEW DECATUR, ALABAMA.

ELECTRIC BROILER AND TOASTER.

1,251,232.   Specification of Letters Patent.   Patented Dec. 25, 1917.

Application filed May 26, 1917. Serial No. 171,148.

*To all whom it may concern:*

Be it known that I, CHARLES E. HUBBARD, a citizen of the United States of America, residing at New Decatur, in the county of Morgan and State of Alabama, have invented certain new and useful Improvements in Electric Broilers and Toasters, of which the following is a specification, reference being had therein to the accompanying drawing.

This invention relates to an electric broiler and toaster and has for its principal object the production of a structure wherein the meat to be broiled is carried within a casing upon a plurality of andirons so as to be easily affected by the heat of the heating elements.

Another object of this invention is the production of an electric broiler and toaster wherein the heating elements are carried within the casing adjacent the andirons so as to permit the heat to affect both sides of the meat simultaneously, thereby broiling the meat in a comparatively short time.

Another object of this invention is the production of an electric broiler and toaster wherein the andirons slant toward their inner edges so as to cause the juice to be caught by the slanting andirons and directed toward the inner portions of the casing.

A still further object of this invention is the production of an electric broiler and toaster wherein a simple and efficient adjusting means is provided so as to permit the andirons to be moved close together or farther apart according to the thickness of the meat to be broiled.

With these and other objects in view this invention consists in general of certain novel combinations, constructions and arrangements of parts as will be hereinafter fully described and claimed.

In the accompanying drawings:—

Figure 1 is a detail perspective view of the casing of the electric broiler and toaster, showing the same carried upon a drip pan.

Fig. 2 is a central vertical section through the electric broiler and toaster.

Fig. 3 is an elevation of the rear end of the device.

Fig. 4 is a fragmentary vertical sectional view through one end of the electric broiler and toaster taken on the line 4—4, Fig. 3.

Fig. 5 is a transverse section through one end of the structure taken on the line 5—5, Fig. 3, the andirons and heating elements being removed.

Fig. 6 is a detail perspective view of the interior of one of the andirons.

Fig. 7 is an elevation of the andirons showing the same connected together.

Referring to the accompanying drawings by numerals, it will be seen that the electric broiler and toaster comprises a casing comprising a pair of sections 1, as shown clearly in Figs. 1, 2 and 3. These sections comprise sides 2 having inwardly-extending tops 3 and inwardly-extending bottoms 4 formed integrally upon the sides 2. The fixed ends 5 are formed upon the sections 1 so as to connect the tops and bottoms, as shown clearly in Fig. 1. At the rear end of the casing there are formed reduced ends 6 which support hinges 7. These hinges 7 are also fixedly mounted upon the movable fillers 8 which overlap each other as shown in Figs. 1 and 5. In order to hold these fillers 8 in engagement with each other and in an adjusted position, these fillers 8 are provided with alined slots 9 through which the bolts 10 extend, as shown in Figs. 4 and 5, whereby the projecting ends of the bolts may receive the butterfly nuts 11 for adjustably connecting the fillers 8 to each other. Although these fillers 8 will be held in a fixed position, it is obvious the two sections may be swung apart since they will pivot upon the hinges 7 as illustrated in dotted lines in Figs. 2 and 5. It is also obvious that in order to facilitate this pivotal movement of the sections 1, handles 12 are carried upon the sides 1, as shown in Figs. 1 and 2, for facilitating this swinging movement.

An asbestos lining 13 is positioned within the casing as shown in Fig. 2, so as to fit snugly upon the inner surfaces of each section 1 and thereby retain the heat within the casing.

End frames 14 are positioned within the sections 1, fitting adjacent the sides 2, and these end frames 14 carry suitable heating elements 15 illustrated in the present drawing as a resistance for an electric circuit. A suitable source of electric supply may be conducted by the feed 16 to the heating elements 15 whereby heat may be generated within the casing when it is desired to broil or toast meats or some other substance within the electric broiler. It is, of course, obvious that some other heating element, such for instance as gas, may be employed in connection with this invention without departing from the spirit thereof, although electricity is preferred.

The end walls 17 support the elongated andirons 18, as shown clearly in Figs. 6 and 7. These andirons 18 slant toward their inner side edges as illustrated clearly in Fig. 2, so as to cause the juice which flies from the meat being broiled to be caught upon the slanting surfaces and directed toward the meat. These slanting andirons 18 may be provided in any desired number being spaced apart so as to carry the upwardly-extending spurs 19 at spaced intervals along their inner edges, thereby permitting a steak to be carried upon the spurs in a vertical plane. Hinges 20 are secured by bolts 21 passing through the slots 22 formed in the end portions of the hinges, as shown in Fig. 7. These bolts 21 project through a plurality of the end walls 17 so as to receive butterfly nuts 23 for retaining the hinges 20 in an adjusted set position upon the end walls 17 of the andirons. Since these hinges are adjustably mounted upon the andirons, it is obvious the andirons may be adjusted to accommodate steaks of various thicknesses, while these andirons are swung together by handles 24 projecting from the remaining end walls 17 of the andirons. After these handles have been swung toward each other and the andirons are retaining the steak upon the spurs 19, these handles 24 will project through the end opening 25 formed in the casing 1.

In order to support the casing there is provided a concave drip pan 26 having supporting standards 27 adjacent its corners. An elongated retaining standard 28 has the foot 29 formed upon its lower end and this foot is retained in a fixed position upon the pan 26. This retaining support 28 is adapted to project through the casing adjacent one end thereof, as shown clearly in Figs. 1 and 4, and will in this manner hold the casing from accidental movement or displacement from the concave pan 26. It is obvious that because of the concave construction of this pan, as shown in Fig. 1, the juice which drips from the broiling meat will be caught by this concave pan, and since an auxiliary vessel may be placed adjacent one end of the concave pan 26 this juice may be readily caught.

When this device is in operation the casing is swung to an open position by pivoting upon the hinges 7, and then the handles 24 of the andirons may be gripped and swung apart so as to permit free access to the space between the andirons. As above explained, the space between the andirons may be increased or diminished by the adjusting of the hinges 20 while the fillers 8 may be adjusted so as to take up play which might be occasioned by the adjustment of the andirons. After the steak has been positioned upon the spurs 19 and the andirons are swung together, the casing is then closed. It is of course obvious that the heating elements are at all times retained within the two sections of the casing as illustrated in Fig. 2. After the casing has been closed, any suitable securing means, not deemed necessary to be herein disclosed, may be used to hold the two sections in a closed position. The current may then be supplied to the heating elements 15 so as to cause the elements thus heated to radiate sufficient heat to affect the broiling or toasting of the meat carried upon the spurs 19. The juice which flies from the broiling meat will be caught by the slanting andirons and directed back onto the meat, although the juice which falls from the meat will be caught finally by the concave plate and directed to a receiving receptacle.

From the foregoing description it will be seen that a very efficient electric broiler and toaster has been provided for rapidly broiling a steak carried within the broiler by having both sides of the steak cooked at the same time, while the construction of the device is such as to permit its size to be varied according to the size of the steak carried thereby, while the structure will also insure the retention of the juice which ordinarily flies from a piece of cooking meat.

What is claimed is:—

1. In a device of the class described, the combination of a casing, heating means carried within said casing, andirons positioned within said casing adjacent said heating means, said andirons comprising end walls connected by longitudinally-extending andiron-bars, said bars slanting inwardly toward their inner edges, spurs formed upon said inner edges whereby an article to be cooked may be carried by said spurs so as to permit said heating means to simultaneously affect both sides of the article while said slanting bars will direct juice or like substance flying from the article being carried thereon back onto the article.

2. In a device of the class described, the combination of a casing, heating means carried within said casing, andirons positioned within said casing adjacent said heating means, said andirons comprising end walls, longitudinally-extending andiron-bars carried by said end walls, said bars slanting toward their inner edges, spurs formed upon said inner edges, slotted hinges engaging said end walls, bolts passing through the slots of said hinges and through said end walls, nuts carried by said bolts whereby said andirons are pivotally and adjustably connected together thereby allowing various sized articles to be carried upon said spurs.

3. In a device of the class described, the combination of an outer casing, said outer casing comprising a pair of sections, said casing having a pair of overlapping fillers at one end, said fillers having alined slots, bolts passing through said slots, nuts carried upon said bolts whereby said fillers are adjustably connected together in a set position, means for hingedly connecting said fillers to said sections whereby said sections may be allowed to pivot, heating means carried within said casing, and supporting means carried adjacent said heating means.

4. In a device of the class described the combination of a casing, heating means carried within said casing, andirons positioned within said casing adjacent said heating means, said andirons comprising end walls, andiron bars carried by said end walls and being inclined downwardly toward their inner edges and means formed upon the inner edges of said andirons for firmly gripping an article of food for holding the same between said andirons for thoroughly cooking the same.

5. In a device of the class described the combination of a casing, heating means positioned therein, article gripping means carried by said casing, said casing provided with an adjustable rear end for facilitating the adjustment of said casing to suit the thickness of different articles cooked between the sections of said casing, means for hinging said sections together for permitting one section to be swung downwardly with respect to the other section and a supporting member engaging the rear end of said casing for firmly anchoring said casing in engagement with a support.

In testimony whereof I hereunto affix my signature.

CHARLES E. HUBBARD.